United States Patent Office 3,550,123
Patented Dec. 22, 1970

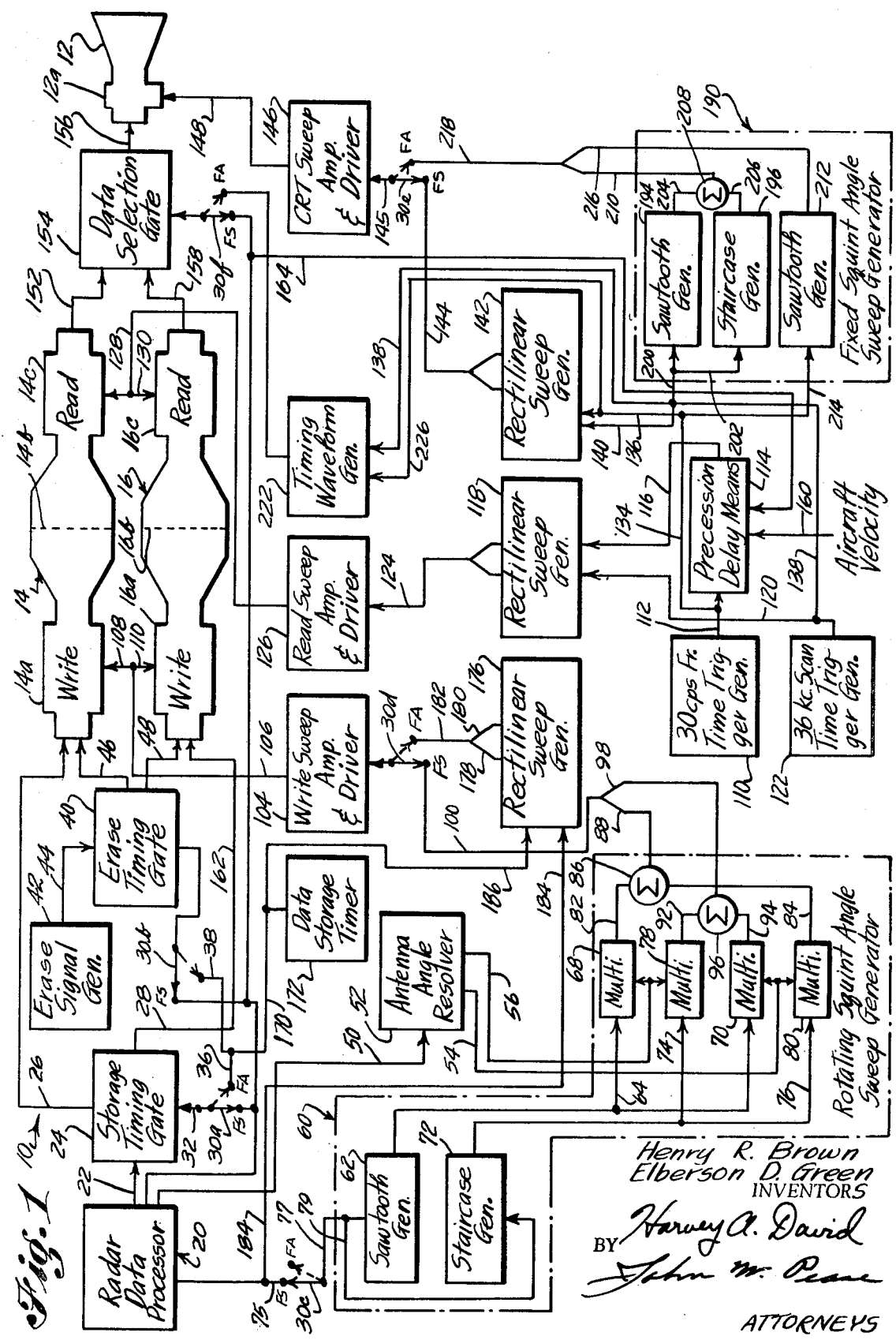

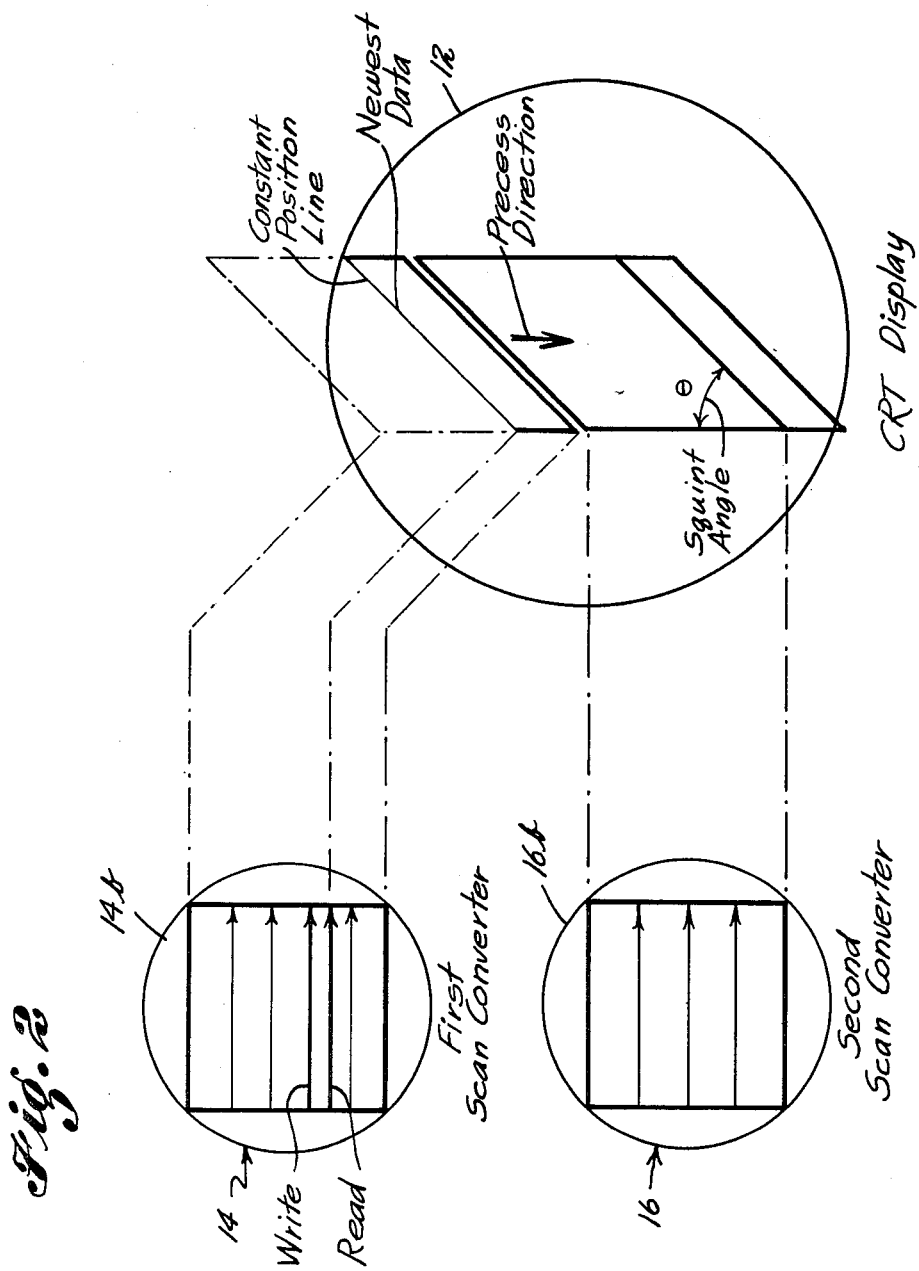

3,550,123
REAL TIME PASSING SCENE DISPLAY
Henry R. Brown, Tustin, and Elberson D. Green, Santa Ana, Calif., assignors, by mesne assignments, to the United States of America as represented by the Secretary of the Navy
Filed Dec. 7, 1967, Ser. No. 690,706
Int. Cl. G01s 7/04, 7/06
U.S. Cl. 343—5                                         6 Claims

ABSTRACT OF THE DISCLOSURE

A system for providing a real time display of synthetic aperture radar gathered range data in TV format and having passing scene realism and comprising a plurality of double ended scan conversion means on which radar data is alternatively stored as gathered by a relatively slow radar scanning process, and which is read out in a conventional TV raster at a relatively high frame rate, e.g., 30 frames per second, and which system introduces a time delay in the read out and display process so as to cause the display to precess and hence move in a direction and rate corresponding to the velocity of the radar bearing airplane.

BACKGROUND OF THE INVENTION

The mapped result of synthetic aperture radar is commonly viewed only on film. There is a demand, however, for real time viewing. The techniques of radar display that have been developed for non-synthetic aperture radar are generally not applicable to this type of mapping. The reason, in general, is that the map material is gathered rather slowly because the antenna motion is relatively slow as compared with a non-processing radar. This in turn generates new and special demands upon a display that will operate in real-time for a synthetic aperture radar. This is true not only of the fixed angle side looking or squint looking mode of operation but also for the scanning mode. Typical frame times in a forward scanning mode may be one second. The time needed to map a corresponding swath of ground by a side looking mode may run as high as thirty seconds.

One special technique that has been developed to give real-time viewing of the side looking mode is a special cathode ray tube in which the electron excited phosphor is on a belt and actually moves. This technique is not applicable to the forward scanning mode. The special problem involved is the duration of display because of the long data gathering time. Most phosphors do not have sufficient persistence to be useful and the few phosphors that may have adequate persistence fall into the opposite shortcoming (particularly in the forward scanning mode) where the second scan of the antenna overlays the first and the phosphor has not decayed, there is a smearing that will be especially objectionable.

A second technique that has been used or is at least applicable to the forward scanning synthetic aperture radar is a storage tube which will retain the image for an adequate length of time plus an erase feature which precedes the writing of new information. This handles both objections in that the persistence is long enough and the prior image is erased so that smearing does not occur. This technique however has two limitations that are overcome by the disclosed mechanization. One objection is that the erase line is a disturbance in itself, and there is no apparent motion to the successive frames that are taken. There is a simple jump or discontinuity between the two frames. This occurs because of the significant length of time between scans and because the high speed aircraft causes a significant travel between scan times.

SUMMARY OF THE INVENTION

With the foregoing in mind, it is a principal object to provide an improved display system for permitting real time viewing of the mapped results of synthetic aperture radar.

Another object of the invention is the provision of an improved radar display system which is characterized by a high degree of passing scene realism.

Yet another object of the invention is the provision of an improved synthetic aperture radar display system providing in TV format the mapped results of radar range data with substantially real time, passing scene realism, and which is free of smear, erase line disturbances, or visible discontinuities between frames.

As another object the invention aims to provide an improved radar display system of the foregoing character comprising a plurality of double ended scan converters (that is, having the ability to write and read simultaneously), a display tube such as a high resolution TV type cathode ray tube or kinescope, and timing circuitry including precession delay means operative to introduce a delay in the data read out such that the data painted on the display tube precesses so as to present apparent motion at a rate corresponding to the speed of the aircraft with respect to terrain being swept by the radar.

BRIEF DESCRIPTION OF THE DRAWINGS

The invention may be further said to reside in certain arrangements and combinations of elements which cooperate to provide the above mentioned objects and advantages as well as others which will become apparent from the following description of a presently preferred embodiment when read in conjunction with the accompanying sheets of drawings forming a part of this specification, and in which:

FIG. 1 is a block diagram schematically illustrating a radar display system embodying the present invention; and FIG. 2 is a diagrammatic illustration of the manner in which data is stored and read from scan conversion elements of the system of FIG. 1 and displayed on a display tube thereof.

DESCRIPTION OF THE PREFERRED EMBODIMENT

In the form of the invention illustrated in FIG. 1 and described hereinafter there is provided a real-time, passing-scene display system indicated generally at 10. The system comprises a high resolution, cathode ray tube 12 of the television type, hereinafter referred to simply as the display tube 12, on which the resulting mapped display of airborne radar gathered range data is ultimately presented. The system 10 further comprises a pair of double-ended scan converters 14 and 16 of the cathode ray storage tube type each of which is capable of writing or storing high resolution data and of simultaneously reading out such data. Thus, the scan converter 14 comprises a write end 14a in the form of a cathode ray gun and deflection means, a storage screen or element 14b, and a read end 14c comprising cathode ray means for scanning and reading data from the storage element. In addition, the write end 14a has erasing capability. Similarly, the scan converter 16 has a write/erase end 16a, a storage element 16b, and a read end 16c. The converters 14, 16 may conveniently be those commercially identified as H-1161 scan conversion tubes.

The system 10, as a preferred embodiment of the invention, has provision for operation in either a fixed squint angle (FA) mode or a rotating squint angle mode. In the former (fixed angle) mode, the radar beam scan of terrain is effected solely by the travel of the radar carrying aircraft, while in the latter mode (rotating squint angle) the antenna actually causes the beam to scan, for example in azimuth, usually in a direction generally forward of the aircraft. The rotating squint angle mode may also be termed the forward scan (FS) mode.

Various input signals are obtained from the radar processor which is schematically indicated at 20. Thus, the radar processor 20 provides high resolution, range data signals as indicated by flow line 22 to a storage timing gate 24 which is in turn connected to pass the high resolution data signals alternatively to the writing ends 14a, 16a, respectively, of the scan converters 14 and 16 via lines 26 and 28.

A mode selector switch is provided for selecting the fixed angle (FA) or forward scan (FS) mode of operation, and comprises a plurality of switch contactors 30a, 30b, 30c, 30d, 30e, and 30f. The contactor 30a is connected by line 32 to the storage timing gate 24. When the system is operated in the FS mode, the storage timing gate 24 is controlled by end of sweep (EOS) signals conducted thereto from the radar 20 via line 34, contact 30a, and line 32. Simultaneously EOS signals are passed via lines 36, 38 and contactor 30b to an erase timing gate 40. The erase timing gate 40 controls the application of data erase signals, generated by an erase signal generator 42 and conveyed to the gate 40 by line 44, to the respective write and erase ends 14a and 16a via lines 46 and 48.

Also, when operating in the FS mode, the radar processor 20 provides antenna position signals via line 50 to an antenna angle resolver 52 which resolves the position signals into signals indicative of the sine of the antenna angle on line 54 and the cosine of the antenna angle on line 56. These sine and cosine signals are utilized in a rotating squint angle sweep generator, generally indicated at 60, to provide sweep signals to be utilized in deflecting the electron beams in the write ends 14a, 16a during FS operation.

The rotating squint angle generator 60 comprises a sawtooth generator 62 connected by lines 64, 66 to multipliers 68 and 70 wherein the sawtooth waveform from generator 62 is combined respectively with the cosine signals and sine signals from the antenna angle resolver 52. The generator 60 also comprises a staircase generator 72 connected by lines 74, 76 to multipliers 78 and 80 wherein the staircase waveform generator 72 is combined respectively with the cosine and sine signals from the resolver 52. The generators 62 and 72 are conveniently provided with timing signals from the radar processor 20 via line 75, switch contactor 30c, and lines 77, 79. The outputs of multipliers 68 and 80 on lines 82 and 84 are summed by summation means 86 to provide on line 88 a ground track sweep signal, while the outputs of multipliers 78 and 70 on lines 92 and 94 are summed by summation means 96 to provide on line 98 a cross track sweep signal.

For convenience, the lines 88, 98 are illustrated as being merged into a single cable or flow line 100 whereby the ground track sweep and cross track sweep signals are conveyed, via mode selector switch contactor 30d and line 102, as inputs to a write sweep amplifier and driver 104. The latter amplifies the just mentioned signals and applies them via lines 106, 108, and 110 to drive the writing beam deflection means of the scan converter write ends 14a, 16a.

In the FS mode of operation, consider as a starting point that the storage mesh or elements 14b and 16b of the scan converters 14 and 16 are both empty. Now, as the antenna scans in azimuth, the writing beam of the first scan converter 14 rotates in synchronism with the antenna. The high resolution range signals that are supplied via line 22 from the processor 20 are painted directly on the storage element 14b. As the antenna reaches the end of its scan and reverses, as indicated by the EOS signal on line 36, the storage timing gate 24 directs subsequent range signals to the second scan converter 16, the writing beam of which is caused to begin to rotate backwards in synchronism with the antenna rotation. To this point, what has been accomplished is to store on the first scan converter storage element 14b the high resolution data gathered by one direction of scan and to begin to store on the storage element 16b of the second scan converter 16 the high resolution data being gathered by the second or return scan of the antenna.

Simultaneously with the writing of high resolution data into storage on the element 14b, the read beam of the reading end 14c of the first scan converter 14 is reading out the information in a normal TV raster, that is thirty frames per second in a rectangular format. To this end, the system 10 comprises a 30 c.p.s. frame time trigger generator 110 connected by line 112 to provide timing signals to a precession delay means 114 which introduces a time delay in the timing signals for a purpose which will presently be made apparent. The delayed signals are conveyed from the delay means 114 via line 116 as one input to a rectilinear sweep generator 118. The other input to the sweep generator 118 comprises 36 kc. scan time trigger signals provided thereto on line 120 from a 36 kc. scan time trigger generator 122.

The rectilinear sweep generator 118 provides horizontal and vertical signal components via line 124 to a read sweep amplifier and driver 126. The amplifier and driver 126 is connected to provide sweep drive signals to the deflection means of the read ends 14c and 16c of the scan converters 14, 16 via lines 128, 130.

The 30 c.p.s. frame time trigger signals and the 36 kc. scan time trigger signals are also conveyed directly via lines 112, 134, 136 and lines 120, 138, 140 to a rectilinear sweep generator 142, the output of which comprises horizontal and vertical timing signals conveyed via line 144 and mode switch contactor 30e and line 145 to a cathode ray tube sweep amplifier and driver 146. The output of the latter comprises sweep drive signals applied as indicated by line 148 to the deflection means 12a of the display tube 12.

The data being read from the first converter 14 at 30 frames per second is passed as shown by line 152 to a data selection gate 154 and thence as shown by line 156 to the display tube 12 for presentation in conventional rectangular TV format as a mapped representation of the radar return.

As the second scan converter 16 begins to fill with high resolution data, it also is read out by the read beam thereof in TV format providing data via line 158, data selection gate 54, and line 156 to the display tube 12. These two output signals, that is the outputs of the two scan converters, are summed electrically and displayed simultaneously at the display tube 12. There is, of course, a significant amount of motion that has occurred between the time of data storage in the first scan converter 14 and that of the second converter 16 and hence a substantial discrepancy between the individual displays which would result therefrom at tube 12. For example, if the antenna scan rate is one second and the speed of the aircraft is two thousand feet per second, there is a two thousand foot discrepancy in the range data between the information stored on the two scan converters. In order that these two signals on lines 152, 158 will be summed and displayed in register with each other, it is necessary that the first or forward charged scan converter 14 be read out in such a way that the reading process, when painted on the display tube 12, precesses down the face of the display tube.

This is the purpose of the previously mentioned precession delay means 114 which introduces a delay which varies with the aircraft velocity. Thus the delay means 114 receives aircraft velocity signals via line 160 as an input. The rate of precession on the display tube 12 is thereby synchronized with the aircraft velocity and gives the impression, when viewing the display, of a passing scene.

When the antenna reaches the end of its scan in one direction (say the forward scan), the scan converter, e.g., converter 16, which contained a full data charge during the time of that scan, is erased by erase signals passed by the erase timing gate 40, and converter 14, which was receiving the newest data during that forward scan, now becomes the fully charged converter and remains so during the next, or return, scan. The just erased converter 16 is then painted with new high resolution data as the antenna scans back.

The precession delay is introduced by delay means 114 during the read out of each of the converters, the delay means 114 being also responsive via lines 162 and 164 to the EOS signals to insert the delay so that the direction of precession is always the same on the display tube 12 although the sweep of the antenna reverses between forward and return scans. Likewise, the data selection gate 154 is responsive to the EOS signals via mode selector switch contactor 30f during FS mode operation, to selectively pass the newest data readout and prevent display of any erase disturbances from the erase process in the converters 14 and 16.

The entire process is continually repeated alternatively with respect to the scan converters 14 and 16 and the net result of the process is continuously moving or passing scene display in real time of the high resolution data gathered in the FS.

In addition to the FS mode, the system 10 may be utilized in the FA (fixed side or squint angle) mode. For operation in the FA mode, the mode selector switch contactors 30a . . . 30f are shifted from the illustrated full line positions to their respective dotted line positions. Thus, the storage timing gate 24 will then receive timing signals via line 170 and mode switch contactor 30a from a data storage timer 172. The write and sweep amplifier and driver 104 receives horizontal and vertical sweep signals from a rectilinear sweep generator 176, as indicated by lines 178, 180, 182, and via switch contactor 30d. Timing signals are provided to the sweep generator 176 for this purpose via lines 75 and 184 from the radar data processor 20, and via lines 170, 186 from the data storage timer 172.

In addition, a fixed squint angle sweep generator, generally indicated at 190, is provided to generate cross track sweep and ground track sweep signals to the sweep amplifier and driver 146. Thus, a sawtooth generator 194 and a staircase generator 196 are provided with 36 kc. trigger signals from the scan time trigger generator 122 via lines 120, 138, 200, and 202. The sawtooth generator 194 and the staircase generator 196 are connected by lines 204 and 206, respectively, to summation means 208 where the sawtooth and staircase output waveforms are combined to provide, on line 210, cross track sweep signals.

A sawtooth generator 212 receives 30 c.p.s. frame time trigger signals from the frame time trigger generator 110 via lines 112, 134, and 214. This sawtooth generator 212 provides a sawtooth waveform serving as ground track sweep signals on line 216. Lines 210 and 216 are conveniently shown as merging into a single cable or line 218 carrying the cross track and ground track sweep signals which are then carried by mode selector switch contactor 30e and line 145 to the sweep amplifier and driver 146.

When the mode selector switch contactors are in the FA position, data selection timing signals are provided to the data selection gate from a timing waveform generator 222 via line 224 and contactor 30f. The timing waveform generator 222 generates its output in response to trigger signals from the 30 c.p.s. frame time trigger generator 110 via lines 112, 134, 136, and 226, and from the 36 kc. scan time trigger generator 122 via lines 120 and 138.

The system 10 works substantially the same in the FA mode as in the previously described FS mode, with the changes being in certain timing signals as will be evident from the foregoing description, notably the substitution of timing signal generators such as the data storage timer 172 as a source rather than EOS signals from the radar processor, the rectilinear sweep generator 176 for the rotating squint angle sweep generator 60, and the squint angle generator 190 for the rectilinear sweep generator 142.

Presume as a starting point, in the FA mode, that one of the scan converters 14, 16 has been fully charged with high resolution data gathered as the airplane progressed. This data is read out at normal TV rates onto the display tube 12. As before, in order to impart the sense of motion for passing scene realism each frame of the read out process must precess, that is, it must begin slightly later than the frame rate of the display tube 12. This precession is introduced by the precession delay means 114. Now, as the airplane progresses, the second scan converter begins to be filled with high resolution data. The starting point of the read out sweep must also precess in order to keep track with the old data stored in the first scan converter.

Because the resolution limitation in the described system is in the scan converters 14, 16 rather than in the display tube 12, the storage in the converters 14, 16 is advantageously placed in square format even though it may have been gathered at some other squint angle. This is illustrated in FIG. 2 wherein data gathered at some squint angle $\theta$ is stored in rectangular format on the storage elements 14b, 16b of the first and second scan converters 14, 16.

The data is read out of the converters rectilinearly and painted on the face of display tube 12 in the angle $\theta$ at which the information was originally gathered. As long as the data is painted at the original angle $\theta$, there will be no distortion in the final map.

From the foregoing detailed descrption of the system 10 which is a presently preferred embodiment, it will be recognized the invention has accomplished the previously mentioned objects and advantages, as well as others apparent from the description, and that in particular it extends the utility of synthetic aperture radar when used in the forward scan mode, or alternatively, in the fixed angle mode of mapping.

Obviously many modifications and variations of the present invention are possible in the light of the above teachings. It is therefore to be understood that within the scope of the appended claims the invention may be practiced otherwise than as specifically described.

What is claimed is:

1. A radar display system for displaying radar data from a radar processor of an airborne radar as a substantially real time, passing scene display, said system comprising:
   first and second double ended scan converters, each having a write end, a read end, and being capable of writing data into storage and simultaneously reading stored data;
   storage timing gate means responsive to first timing signals and operative to direct data input signals from a radar processor alternatively to said first and second converters;
   write sweep driver means connected to the write ends of said first and second converters for causing data to be stored in a predetermined storage format and at a first rate;
   first sweep generator means connected to said write sweep driver means for providing sweep signals thereto;
   read sweep driver means connected to the read ends of said first and second converters for causing data to be read therefrom in a TV raster format and at a second rate substantially faster than said first rate at which the data was stored;

sweep generator means connected to said read sweep driver means for providing sweep signals thereto;

time trigger signal generator means;

precession delay means connected to receive time trigger signals from the time trigger signal generator means and operative to introduce a time delay in said time trigger signals, the delay being a function of the velocity of the aircraft carrying the radar;

a TV type cathode ray tube display means;

cathode ray tube sweep driver means connected to effect cathode ray deflection in said display means;

third sweep generator means connected to provide sweep signals to said cathode ray tube sweep driver means; and data selection gate means connected to receive data read from the read end of each of said converters, said data selection gate means being responsive to second timing signals to pass to said display means data read from said read ends.

2. A radar display system as defined in claim 1, and:

said scan converters each comprising erase means;

an erase signal generator;

an erase timing gate connected to receive erase signals from said erase signal generator and to pass erase signals alternatively to said erase means of said first and second scan converters in response to the first mentioned timing signals.

3. A radar display system as defined in claim 2, and wherein:

said first sweep generator means comprises a rotating squint angle sweep generator for generating sweep signals corresponding to the sine and cosine of the antenna angle;

said second sweep generator means comprises a rectilinear sweep generator;

said third sweep generator comprises a rectilinear sweep generator; and said first and second timing signals comprise end of sweep signals corresponding to changes in direction of antenna sweep.

4. A radar display system as defined in claim 2, and comprising:

data storage timer means for generating said first timing signals; and a timing waveform generator for generating said second timing signals.

5. A radar display system as defined in claim 4, and wherein:

said first sweep generator comprises a first rectilinear sweep generator;

said second sweep generator comprises a second rectilinear sweep generator; and said third sweep generator comprises a fixed squint angle sweep generator.

6. A radar display system as defined in claim 5 and further comprising:

a third rectilinear sweep generator;

a fixed squint angle sweep generator;

switch means for alternatively connecting said write sweep driver to receive sweep signals from said first rectilinear sweep generator or from said rotating squint angle sweep generator; and switch means for alternatively connecting said cathode ray tube sweep driver to receive sweep signals from said third rectilinear sweep generator or from said fixed squint angle sweep generator.

References Cited

UNITED STATES PATENTS 3,218,637 11/1965 Balding.

RODNEY D. BENNETT, Primary Examiner

M. F. HUBLER, Assistant Examiner